2,919,278
Patented Dec. 29, 1959

2,919,278

PROCESS FOR PRODUCING LOWER ALKYL ESTERS OF 2-BENZOTHIAZOLE CARBAMIC ACID

Terrence D. McGowan, Wilmington, Del., assignor to E. I. du Pont de Nemours and Company, Wilmington, Del., a corporation of Delaware No Drawing. Application March 15, 1957
Serial No. 646,232

8 Claims. (Cl. 260—305)

This invention relates to a process for the preparation of lower alkyl esters of 2-benzothiazole carbamic acid.

Recently it has been found that the lower alkyl esters of 2-benzothiazole carbamic acid possess outstanding fungicidal activities. For this reason there has developed a real need for a commercially practical method for preparing these compounds in large quantities.

Heretofore, these compounds were prepared by treating 2-aminobenzothiazole, in an organic liquid reaction medium and in the presence of an acid acceptor such as triethylamine, with an alkanol chloroformate. The use of these anhydrous conditions was believed necessary because of the well-known instability of these chloroformates in the presence of even traces of water. The economical operation of this anhydrous process of course required the recovery of both the organic liquid and the acid acceptor, making this a complicated over-all process for preparing these fungicides. The need for a process for preparing these compounds which requires no expensive recovery steps was obvious.

In accordance with the present process, the lower alkyl esters of 2-benzothiazole carbamic acid are prepared by the following reaction, using an aqueous reaction medium and specific reaction conditions that enable the reaction to be carried on in a simple and commercially practical manner:

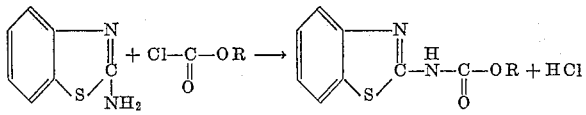

The 2-aminobenzothiazole and water, which is used in sufficient quantity to give a workable suspension or to actually dissolve the reactant when heated, are introduced into a reaction vessel equipped with an efficient agitator. The temperature of the mixture is then raised to within the range of 70–110° C. While maintaining the temperature of the reaction mass within this range, an excess of alkanol chloroformate is slowly added. Simultaneously with the chloroformate there is added a basic material to maintain the pH of the reaction mass in the range of 4.0–9.0. The alkanol chloroformate preferably is introduced below the surface of the reaction mixture especially where the alkanol chloroformate has a boiling point below the temperature of the reaction mixture.

It has been found that this reaction will proceed rapidly giving an excellent yield of high purity product providing the pH of the aqueous reaction medium is within the range of pH 4.0 to 9.0 and the temperature of the aqueous reaction medium is maintained with the range from about 70° C. up to 110° C. during the reaction period. If appreciably lower temperatures or a pH outside this range is employed, the process is extremely unsatisfactory—excessive chloroformate losses and poor yields of low grade product result.

The desired ester forms as a precipitate in the reaction medium. Isolation of the precipitate, such as by simple filtration followed by drying, yields the fungicidally active product in a form adapted for direct usage in fungicidal compositions.

In this process the chloroformate reactant is a lower alkanol chloroformate, that is a chloroformate of an alkanol containing less than 5 carbon atoms. Thus, R in the above formula is an alkyl group of less than 5 carbon atoms, such as methyl, ethyl, propyl or butyl. To give a complete reaction with all of the 2-aminobenzothiazole used, there is employed at least a molecular equivalent amount of the chloroformate, based upon the amount of 2-aminobenzothiazole used. Ordinarily, an excess of the chloroformate, for example up to a 100% molar excess, should be used to insure completion of the reaction.

While satisfactory results are obtained in using any temperature between about 70° C. and 110° C., it is preferred to operate the reaction at a temperature of from 80–100° C., the most preferred range being from 90–100° C.

As indicated by the equation, hydrochloric acid is produced as a by-product. To maintain the pH within the required pH range, it is therefore necessary to add a basic material, that is an acid acceptor, to the reaction medium. For this purpose excellent results are obtained by adding an alkali or alkaline earth metal base. The alkali or alkaline earth metal base may be in the form of a hydroxide such as sodium or potassium hydroxide. Alternatively basic salts such as sodium acetate, basic phosphates, carbonate and bicarbonate salts, and tertiary amines may be used. The carbonate and bicarbonate salts are sometimes less desirable because the evolution of carbon dioxide tends to form a foam.

While the lower alkyl esters of 2-benzothiazole carbamic acid are fungicides, present information indicates that by far the best of these compounds is the methyl ester. Accordingly, the preferred practice of the present invention comprises the process of combining methyl chloroformate with 2-aminobenzothiazole to produce the fungicidal methyl ester of 2-benzothiazole carbamic acid.

Since it is well known that methyl chloroformate is extremely unstable in hot water, it is surprising that this reaction will proceed to any substantial degree of completion using methyl chloroformate. Nevertheless, in practice, extremely high yields are obtainable by this method using methyl chloroformate in an aqueous medium.

Because this reaction proceeds rapidly to give a substantially pure product that can be recovered by simple filtration, it is ideally suited for continuous operation. For example, it can be operated on a large commercial scale in a pipe reactor. The reactants are introduced into one end of the reactor, with the reaction product leaving the other end to be filtered, dried, and packaged. The base that is required for pH control is introduced at several spaced locations along the length of the pipe reactor. In this manner large quantities of product can be obtained simply and rapidly without requiring extensive equipment.

In order that the present invention can be better understood, the following examples are given:

EXAMPLE 1

A stirred reaction vessel that is equipped with a reflux condenser is charged with 150 parts of 2-aminobenzothiazole and 1000 parts of hot tap water at 65° C. The suspension is heated to a slow reflux (temperature 92–95° C.). At this time, and over a period of one hour, 131 parts of commercial methyl chloroformate (79% purity) is added below the surface of the reaction mixture, and 400 parts of 2.72 N sodium hydroxide is added to keep the pH at 6.5–7.2. During this addition, the product precipitates.

At the end of the addition period, the reaction vessel is stirred for an additional ten minutes and then the product is collected upon a vacuum filter. After washing with 2000 parts of hot water (65° C.) and drying in a vacuum oven at 100° C., there is obtained 168 parts of substantially pure 2-benzothiazole carbamic acid, methyl ester having a melting point with decomposition at 224–227° C. Analysis by ultraviolet and infrared absorption spectral means shows that the product is of substantially 100% purity.

EXAMPLES 2–5

The following lower alkyl esters of 2-benzothiazole carbamic acid are prepared precisely in accordance with the procedure of Example 1, except using the chloroformate, base and reaction conditions indicated below in place of the chloroformate, base and reaction conditions of Example 1:

Table I

| Example No. | Chloroformate, parts by wt. | Base, parts by wt. | pH | Temp., ° C. | Product |
|---|---|---|---|---|---|
| 2 | ethyl chloroformate, 119 parts | potassium hydroxide, 62 parts | 6.0–6.5 | 80–90 | 2-benzothiazole carbamic acid, ethyl ester. |
| 3 | sec. amyl chloroformate, 180 parts | sodium hydroxide, 48 parts | 4.0–5.5 | 70–85 | 2-benzothiazole carbamic acid, amyl ester. |
| 4 | n-butyl chloroformate, 143 parts | sodium carbonate, 111 parts | 7.0–9.0 | 90–110 | 2-benzothiazole carbamic acid, n-butyl ester |
| 5 | n-propyl chloroformate, 134 parts | sodium acetate, 183 parts | 6.5–7.5 | 85–95 | 2-benzothiazole carbamic acid, n-propyl ester. |

EXAMPLES 6–10

2-benzothiazole carbamic acid, methyl ester is prepared in accordance with the procedure of Example 1 but using the reaction conditions and amounts of methyl chloroformate (MCF) and 2-aminobenzothiazole (2-ABT) set forth in the following Table II:

Table II

| Examples | pH | Temp., ° C. | Parts 2-ABT | Parts, MCF | Yield, Percent |
|---|---|---|---|---|---|
| 6 | 3.0 | 95 | 50 | 47 | 0.5 |
| 7 | 10.0 | 90–94 | 100 | 78 | 13 |
| 8 | 6.5–7.0 | 88–98 | 900 | 620 | 95 |
| 9 | 4.0–5.5 | 80–98 | 750 | 525 | 94 |
| 10 | 4.5 | 80 | 50 | 52 | 90 |

It is to be noted that in Examples 6 and 7 where pHs outside the scope of the present invention were used extremely low yields of this product were obtained, in contrast to the excellent yields of Examples 8–10.

I claim:

1. The process for the preparation of lower alkyl esters of 2-benzothiazole carbamic acid comprising introducing into a reaction zone water as an aqueous reaction medium, 2-aminobenzothiazole, and gradually adding chloroformate of an alkanol containing less than 5 carbon atoms; maintaining the temperature of the aqueous reaction medium within the range from 70° C. to 110° C. during the reaction period; maintaining the aqueous reaction medium at a pH within the range of pH 4.0 to pH 9.0 during the reaction period; and separating the resultant lower alkyl ester of 2-benzothiazole carbamic acid that precipitates from the aqueous reaction medium.

2. The process in accordance with claim 1 wherein said temperature is within the range of 80° C. to 100° C.

3. The process in accordance with claim 1 wherein said pH is within the range of pH 6 to pH 8.

4. The process in accordance with claim 1 wherein said chloroformate is methyl chloroformate.

5. The process in accordance with claim 1 wherein said chloroformate is methyl chloroformate, said pH is within the range of pH 6.5 to pH 7.5 and said temperature is within the range of 90–100° C.

6. The process in accordance with claim 1 wherein there is employed at least a molecular equivalent amount of said chloroformate based on the amount of 2-aminobenzothiazole present.

7. The process in accordance with claim 1 wherein the aqueous reaction medium is maintained under reflux conditions during the reaction period.

8. The process in accordance with claim 1 wherein said chloroformate is methyl chloroformate.

References Cited in the file of this patent

Kucherova et al.: Chem. Abstracts, vol. 41, col. 6242 (1947).

Takahashi et al.: Chem. Abstratcs, vol. 44, col. 1978–9 (1950).

Farthing: Chem. Abstracts, vol. 45, col. 6579 (1951).